(12) United States Patent
Nguyen

(10) Patent No.: US 6,272,283 B1
(45) Date of Patent: Aug. 7, 2001

(54) COPY-PROTECTION FOR LAPTOP PC BY DISABLING TV-OUT WHILE VIEWING PROTECTED VIDEO ON PC DISPLAY

(75) Inventor: Thu N. Nguyen, Milpitas, CA (US)

(73) Assignee: NeoMagic Corp., Santa Clara, CA (US)

( * ) Notice: Subject to any disclaimer, the term of this patent is extended or adjusted under 35 U.S.C. 154(b) by 0 days.

(21) Appl. No.: 09/064,364

(22) Filed: Apr. 22, 1998

(51) Int. Cl.[7] .............. H04N 5/913; H04N 5/76
(52) U.S. Cl. .................. 386/94; 386/95
(58) Field of Search .................. 380/95, 46, 94, 380/1, 52, 4, 55; 360/13, 15; 725/31, 87, 102; H04N 5/913, 5/76

(56) References Cited

U.S. PATENT DOCUMENTS

| | | | |
|---|---|---|---|
| 4,631,603 | 12/1986 | Ryan | 360/37.1 |
| 4,858,036 | 8/1989 | Ginkel | 360/60 |
| 5,034,980 | 7/1991 | Kobota | 380/4 |
| 5,050,213 | 9/1991 | Shear | 380/25 |
| 5,194,965 | 3/1993 | Quan et al. | 358/335 |
| 5,229,852 | 7/1993 | Maietta et al. | 358/140 |
| 5,513,260 | 4/1996 | Ryan | 380/3 |
| 5,530,752 | 6/1996 | Rubin | 380/4 |
| 5,532,920 | 7/1996 | Hartrick et al. | 364/419.1 |
| 5,557,538 | 9/1996 | Retter et al. | 364/514 A |
| 5,572,507 | * 11/1996 | Ozaki et al. | 369/275.4 |
| 5,629,980 | 5/1997 | Stefik et al. | 380/4 |
| 5,633,927 | 5/1997 | Ryan et al. | 380/5 |
| 5,659,613 | 8/1997 | Copeland et al. | 380/3 |
| 5,883,959 | * 3/1999 | Kori | 380/9 |
| 6,137,952 | * 10/2000 | Hogan | 386/94 |

* cited by examiner

Primary Examiner—Robert Chevalier
(74) Attorney, Agent, or Firm—Stuart T. Auvinen

(57) ABSTRACT

Copy protection support is added to the display driver in a laptop PC. Laptop PCs without any copy protection facilitate illegal copying of optical disks such as digital-versatile disk (DVD), since some laptop PCs now include a TV encoder (scan-line converter) that converts the computer-generated formats such as SVGA to TV formats such as NTSC and PAL. While VCRs cannot make copies of computer formats such as SVGA, a VCR connected to the laptop PCs TV-encoder output can make an illegal videocassette copy of a DVD title. The portability of laptop PCs makes them particularly attractive to video thieves. Some PCs are being equipped with TV encoders with advanced copy-protection features such as MacroVision encoders. The video BIOS determines if the TV encoder is MacroVision compliant and is queried by the display driver when a DVD navigator or player requests MacroVision encoding. MacroVision-compliant TV encoders add low-level pulses to the TV output that TV sets confuse with sync pulses degraded by VCR copying. Thus the TV output cannot be copied when MacroVision encoding is used. The display driver emulates copy-protection for older TV encoders that are not MacroVision-compliant. The display driver stops play of copy-protected DVD titles until a user disables the TV output. Multiple DVD players are controlled by the display driver by storing a list of DVD identifiers an the DVD identifier of the last DVD navigator or player to enable MacroVision encoding.

20 Claims, 7 Drawing Sheets

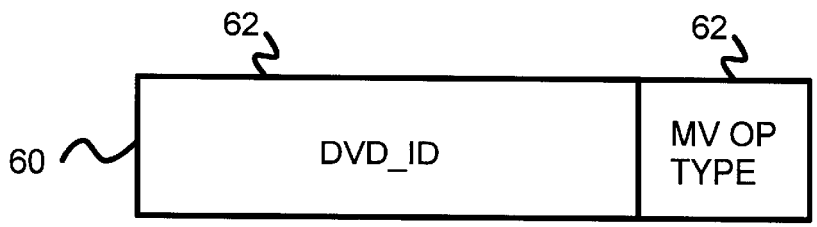
FIG. 4
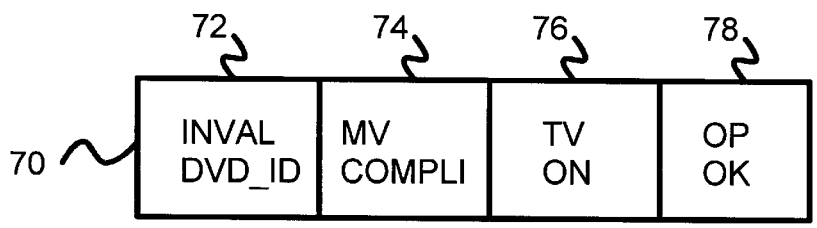
FIG. 5
| INVAL DVD_ID 72 | MV COMPLI 74 | TV ON 76 | OP OK 78 | |
|---|---|---|---|---|
| 1 | 0 | 0 | 0 | INVAL DVD ID |
| 0 | 0 | 1 | 0 | LEGACY TV ON |
| 0 | 0 | 0 | 0 | LEGACY TV OFF |
| 0 | 1 | 0 | 1 | MV OP OK TV OFF |
| 0 | 1 | 1 | 0 | MV ON/OFF FAIL |
| 0 | 1 | 1 | 1 | MV ON/OFF OK |
FIG. 6

COPY-PROTECTION FOR LAPTOP PC BY DISABLING TV-OUT WHILE VIEWING PROTECTED VIDEO ON PC DISPLAY

FIELD OF THE INVENTION

This invention relates to personal computer systems, and more particularly to copyright protection for optical disks playing on a portable PC.

BACKGROUND OF THE INVENTION

Portable personal computers (PCs) have rapidly improved in capabilities and many now are as powerful as desktop PCs. Full multimedia capabilities such as high-fidelity audio and full-motion video are increasingly common on moderately-priced notebook and laptop portable PCs. The laptop PCs often include optical disk drives such as a CD-ROM drive.

The next generation of optical disks is known as digital-versatile disk (DVD). The CD-ROM drives on laptop PCs soon will be replaced with DVD drives. DVD has a much higher storage capacity than CD-ROM, enough that an entire motion picture can fit on a single DVD disk. Motion pictures and other copyrighted works are increasingly more expensive to produce, and release of DVD has been delayed to ensure that adequate copy-protection schemes are in place.

A preferred copy-protection scheme was developed by MacroVision Corp. of Sunnyvale, Calif. A number of patents assigned to MacroVision describe in detail such schemes. See for example, U.S. Pat. No. 5,659,613 by Copeland et al., among others. Low-level pulses can be added during the blanking periods that prevent proper sync on poor-quality copies but allow the original, full-signal-strength program to be played. New decoder integrated circuit chips are becoming available that implement the MacroVision standard, preventing unauthorized play of a copyrighted disk.

FIG. 1A shows a laptop PC driving an external SVGA display. One of the earliest enhancements to laptop PCs was a port for an external cathode-ray tube (CRT) monitor. Laptop PC 20 is playing a copyrighted video from DVD disk 25 that is displayed on flat-panel display 22. Flat-panel display 22 can be a dual-scan liquid-crystal display LCD or an active-matrix thin-film transistor display, or another technology. The image on the built-in flat-panel display 22 is replicated to an external-CRT port on the back of laptop PC 20. External CRT monitor 24 is plugged into this external-CRT port, allowing the image to be viewed on external CRT monitor 24. Newer laptop PCs allow the image to be simultaneously viewed on external CRT monitor 24 and flat-panel display 22, while older laptop PCs disable flat-panel display 22 when the external CRT is in use.

Analog voltages representing the red, yellow, and blue color components of each pixel, and the horizontal and vertical sync pulses are output to the external-CRT port. Digital signals representing these pixels and sync clocks are sent to flat-panel display 22. Thus the graphics controller inside laptop PC 20 must be capable of the format conversion.

Although the copyrighted video from DVD disk 25 can be viewed on external CRT monitor 24, external CRT monitor 24 uses a computer-monitor format, such as super-VGA (SVGA), XGA, etc. Since SVGA format is not compatible with video-cassette recorders (VCRs), the copyrighted video cannot be easily recorded by a VCR despite being played on external CRT monitor 24.

More recently, laptop PCs have been equipped with scan-converters for display on a television (TV). FIG. 1B shows a laptop PC driving a TV. The copyrighted video from DVD disk 25 is displayed on flat-panel display 22. However, laptop PC 20 has a scan-line converter that converts the SVGA format displayed on flat-panel display 22 to the national television standards committee (NTSC) format used by televisions in the United States. Rather than convert to NTSC, some scan converters convert VGA into the phase-alternating-line (PAL) format common in Europe.

TV monitor 26 is a standard NTSC or PAL television receiver with a video-input port. TV monitor 26 gets its feed from the TV-OUT port of laptop PC 20. The copyrighted video from DVD disk 25 is played on laptop PC 20 but visible on TV monitor 26 as well as flat-panel display 22.

Illegal Tape Made by VCR Using Laptop PC's TV-OUT

FIG. 1C shows that an illegal copy of a DVD disk played on a laptop PC can be made by connecting a VCR to the TV-OUT port of the laptop PC. An unscrupulous person or company could make illegal copy 29 of the video from DVD disk 25. The is TV monitor is replaced with VCR 28, which is connected to the TV-OUT port of laptop PC 20. VCR 28 can make a video-cassette tape illegal copy 29 of DVD disk 25 playing on laptop PC 20 since laptop PC 20 formats the video's pixels in the NTSC or PAL formats for the TV-OUT port.

Some laptop PCs soon will include a MacroVision-compliant TV encoder that prevents unauthorized taping by blocking conversion to NTSC format. Most laptop PCs are not MacroVision compliant and do not block TV-conversion.

What is desired is a copyright-protection scheme for portable PCs. Software drivers for the graphics subsystem are desired that can operate with newer MacroVision-compliant TV encoders, and older scan-line converters that are not MacroVision-compliant. It is desired to block viewing of formats that can be copied by a VCR while allowing viewing in computer-monitor formats that are not easily taped.

SUMMARY OF THE INVENTION

A laptop personal computer (PC) prevents illegal copying of videos played on the laptop PC. A graphics controller generates a pixel stream in a computer-graphics format. The pixel stream is for display by a flat-panel display on the laptop PC. An S optical-disk player plays copyrighted optical disks. The optical-disk player outputs copy-protected videos to the graphics controller for display.

A TV encoder is coupled to receive the pixel stream from the graphics controller. It converts the computer-graphics format to a TV format. A video BIOS controls the graphics controller. The video BIOS has a scratch register for storing a flag indicating when the TV encoder is compliant with advanced copy-protection standards.

A display driver is coupled to the video BIOS. It also controls the graphics controller. The display driver also controls the TV encoder. A player application controls the optical-disk player. The player application includes a means for generating a request for copy protection to the display driver.

A copy-protection function in the display driver receives the request from the player application. The copy-protection function includes a means for reading the scratch register in the video BIOS to determine when the TV encoder can accept advanced copy-protection commands from the player application.

A transmitting means in the display driver transmits an encryption key from the player application to the TV encoder when TV encoder can accept advanced copy-protection commands from the player application. An emulation means in the display driver disables the TV encoder when the request from the player application is a request to enable copy-protection in the TV encoder and the flag in the video BIOS indicates that the TV encoder is not compliant with advanced copy-protection standards. Thus copy-protection is emulated by the display driver for non-compliant TV encoders by disabling output from the TV encoder in the TV format.

In further aspects of the invention a plurality of player applications play a plurality of copy-protected videos. Each player application has a player identifier. A last-identifier register is readable by the display driver. It stores the player identifier for a last player application to enable copy protection. A compare means in the display driver compares the last-identifier register to the player identifier for a player application requesting copy protection. An error means in the display driver generates an error code and does not disable copy-protection by the TV encoder when the compare means does not signal a match. Thus only a last player application to enable copy protection can disable copy protection.

In other aspects a system registry stores system parameters. A TV flag in the system registry indicates when the TV encoder is disabled. The TV flag prevents other applications from re-enabling the TV encoder when disabled by the display driver.

In still further aspects a status code is returned to the player application from the display driver. The status code includes a successful operation flag to indicate when the request for copy protection was successfully completed, a TV-on flag for indicating when the TV encoder is enabled and converting the computer-graphics format to the TV format, and
a compliant flag for flag indicating when the TV encoder is compliant with advanced copy-protection standards.

Further aspects of the invention include a method that emulates copy-protection on a personal computer (PC) with a computer display using a computer-generated format that cannot be copied by a VCR recorder. A copy-protection request is sent from a video player application to a display driver. When the TV encoder is active and the copy-protection request is a request to enable the advanced copy-protection features of the TV encoder, an encryption key is sent from the video player application to the TV encoder to enable the advanced copy-protection features. When the TV encoder is active and the copy-protection request is a request to disable the advanced copy-protection features of the TV encoder, an encryption key is sent from the video player application to the TV encoder to disable the advanced copy-protection features. Thus the display driver emulates copy protection for the TV encoder without advanced copy-protection features by disabling the TV encoder when a copy-protected video is played, but the display driver sends the encryption key to the TV encoder with advanced copy-protection features.

BRIEF DESCRIPTION OF THE DRAWINGS

FIG. 4 shows the form at of a request byte sent from the DVD navigator to the display driver.

FIG. 5 shows the format of a status by te sent in reply back to the DVD navigator from the display driver.

FIG. 6 highlights the meaning of return codes from the display driver to the DVD navigator.

DETAILED DESCRIPTION

The present invention relates to an improvement in graphics systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The software or firmware display-driver that is the low-level interface to the graphics controller is modified for copy-protection functions. The display driver uses the video BIOS to determine if a TV encoder (scan-line converter) is present, and if present whether it contains advanced copy-protection features. For TV encoders with advanced copy-protection, the display driver allows the copy-protection software to operate normally.

When the TV encoder does not have advanced copy-protection features, the display driver performs its own copy-protection emulation. A simple approach is to disable all graphics outputs when a copy-protected DVD disk is played. However, the inventor has realized that a less draconian approach can be used with laptop PCs. Instead of disabling all graphics displays, only the displays using TV formats are disabled. Since only the TV-formatted images can be easily taped by a VCR machine, it is safe to continue to display computer-monitor formats such as SVGA.

Figure 1A:
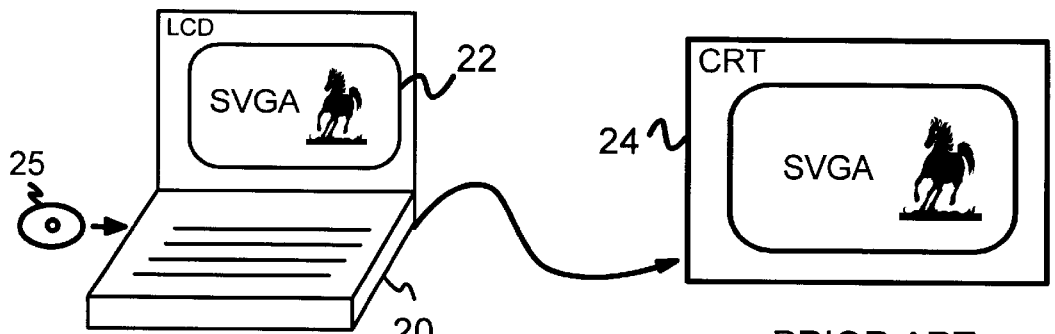
FIG. 1A shows a laptop PC driving an external SVGA display.
Figure 1B:
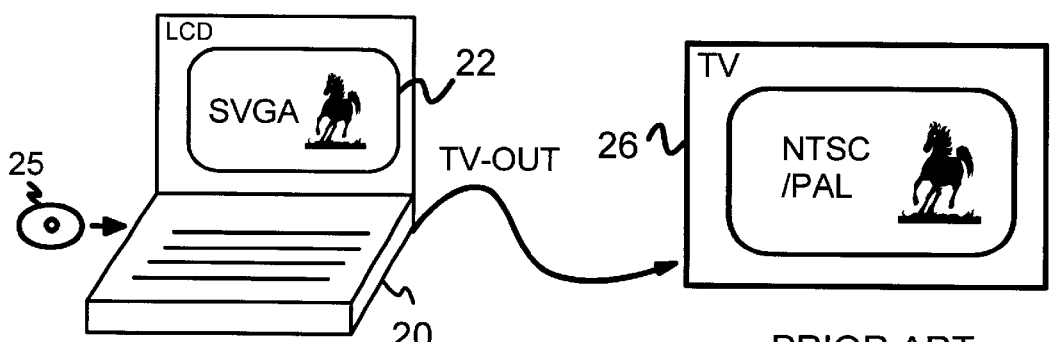
FIG. 1B shows a laptop PC driving a TV.
Figure 1C:
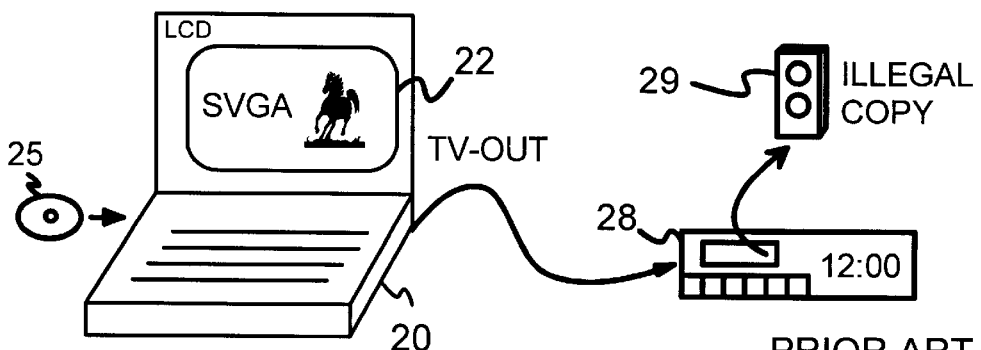
FIG. 1C shows that an illegal copy of a DVD disk played on a laptop PC can be made by connecting a VCR to the TV-OUT port of the laptop PC.
Figure 2A:
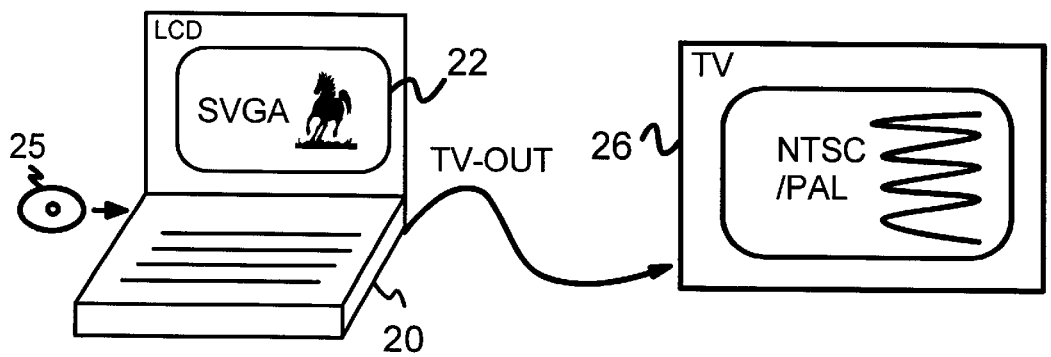
FIG. 2A shows a laptop PC disabling a TV-out put but continuing to show on a SVGA display a video from a copy-protected DVD disk.

TV-Output Blocked But SVGA Display on Laptop PC Continues—FIG. 2A

FIG. 2A shows a laptop PC disabling a TV-output but continuing to show on a SVGA display a video from a copy-protected DVD disk. A copyrighted video from DVD disk 25 is displayed on flat-panel display 22. Laptop PC 20 has a scan-line converter that converts the SVGA format displayed on flat-panel display 22 to the national television standards committee (NTSC) format used by televisions in the United States or into the phase-alternating-line (PAL) format common in Europe and Japan.

TV monitor 26 is a standard NTSC or PAL television receiver with a video-input port. TV monitor 26 is fed from the TV-OUT port of laptop PC 20. The copyrighted video from DVD disk 25 is played on laptop PC 20 and visible on flat-panel display 22, but not visible on TV monitor 26. The display driver in laptop PC 20 disables the TV-output when a copy-protected DVD disk is detected in the player. The display driver either completely disables the TV-output, sending no signal at all, or uses a MacroVision-compliant TV encoder to scramble the picture to prevent clear viewing.

Alternately, the MacroVision-compliant TV encoder can display the video on TV monitor 26, but add weak pulses during the blanking periods. These weak pulses are not strong enough to be confused with synchronizing pulses by TV monitor 26. However, if these weak pulses are input to a video-cassette-recorder (VCR) instead of TV monitor 26, the signal attenuation of the sync pulses during the taping process causes these weak pulses to be confused with the attenuated sync pulses. Loss of synchronization occurs when the tape is played, resulting in loss of picture.

Figure 2B:
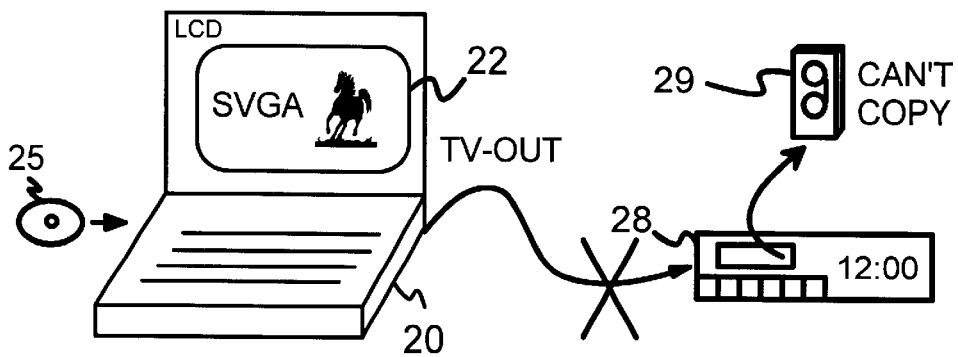
FIG. 2B shows th at a VCR connected to the TV-OUT port of a laptop PC with the copy-protection display-driver cannot make a copy of a copy-protected DVD disk.

FIG. 2B shows that a VCR connected to the TV-OUT port of a laptop PC with the copy-protection display-driver cannot make a copy of a copy-protected DVD disk. VCR 28 is connected to the TV-OUT port of laptop PC 20 by someone trying to make an illegal copy of DVD disk 25. While the video from DVD disk 25 is displayed in SVGA format on flat-panel display 22, the display driver in laptop PC 20 contains copy-protection features of the invention. The display driver either completely disables the output signal to the TV-port when a copy-protected DVD disk 25 is played, or a MacroVision-compliant TV encoder in laptop PC 20 scrambles the TV-OUT output. The MacroVision-compliant TV encoder may also add weak pulses to the TV-OUT signal. These weak pulses do not prevent a TV monitor from viewing the video, but any copy made by VCR 28 is un-viewable, since the sync pulses are attenuated by VCR 28, making the weak pulses relatively stronger. Thus tape copy 29 is not viewable.

Figure 3:
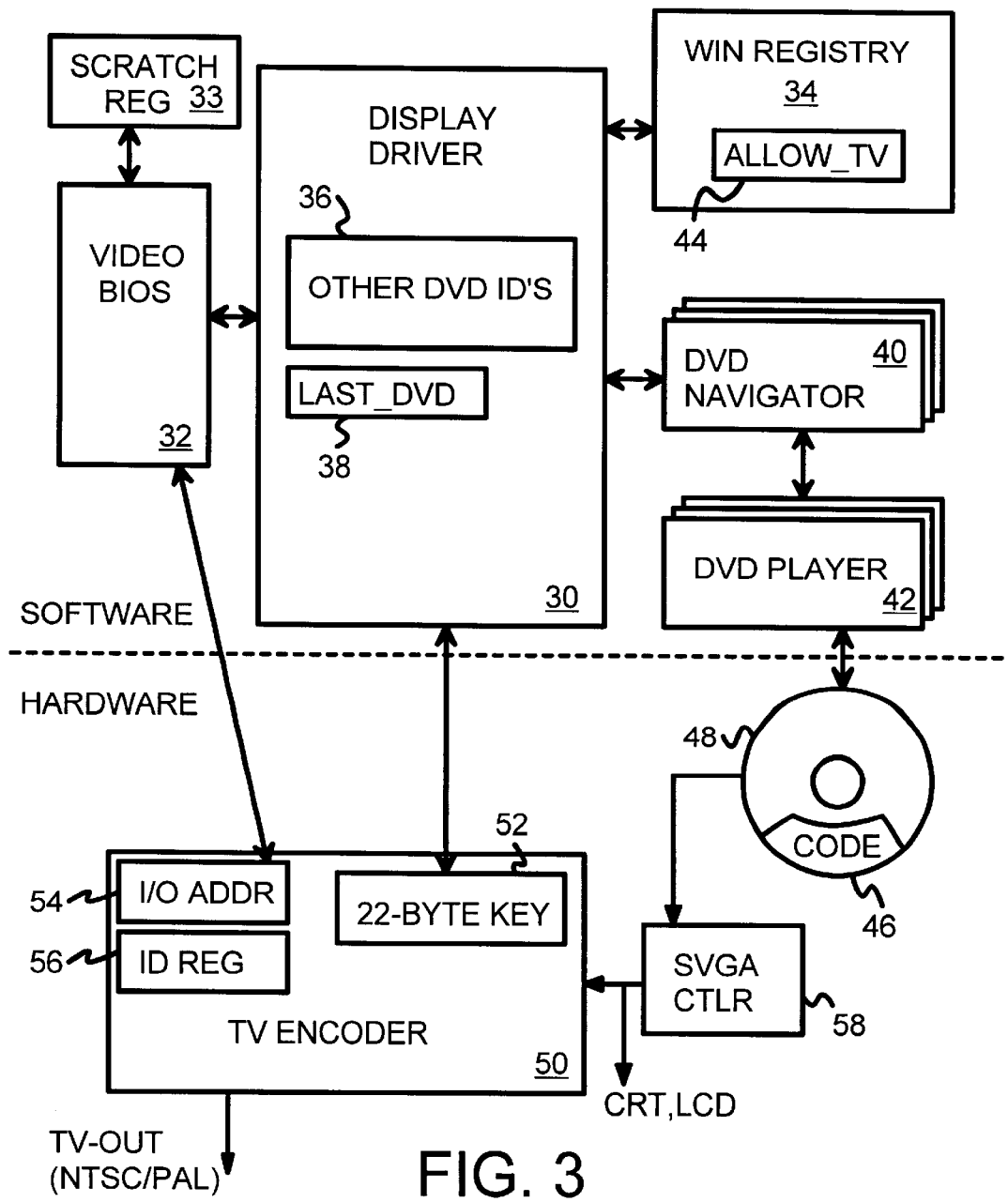
FIG. 3 is a diagram of the hardware and software graphics architecture on a laptop PC that emulates copy-protection for DVD disks.

DVD Copy-Protection-Emulating Display Driver—FIG. 3

FIG. 3 is a diagram of the hardware and software graphics architecture on a laptop PC that emulates copy-protection for DVD disks. Graphics controller 58 receives pixels from application programs or operating-system functions that write to a frame buffer (not shown). Graphics controller 58 converts these pixels into computer-graphics formats used for a built-in flat-panel display and an external CRT monitor. Common computer-graphics formats include CGA, SVGA, and XGA.

TV encoder 50 receives the pixels from graphics controller 58 in the SVGA format and performs scan-line conversion to interleave the horizontal lines and convert the resolution to NTSC or PAL formats. See for example "Portable PC Simultaneously Displaying on a Flat-Panel Display and on an External NTSC/PAL TV Using Line Buffer With Variable Horizontal-Line Rate During Vertical Blanking Period" Ser. No. 08/815,401, now U.S. Pat. No. 5,929,924, assigned to NeoMagic Corp of Santa Clara, Calif. The TV-OUT output from TV encoder 50 can be input to the video-in (cable or VCR inputs) feed of a standard TV monitor.

DVD-disk videos can also be displayed on the flat-panel, CRT, or TV displays. DVD drive 48 is a standard optical-disk drive that is capable of playing (reading) DVD disks. The video information from DVD disk drive 48 is de-compressed, using a hardware or software-based de-compression algorithm such as MPEG, producing a video pixel stream. This video pixel stream is sent to graphics controller 58 as a secondary input of pixels such as a zoom video port. Graphics controller 58 can display the DVD video in a small window that overlays the computer-generated graphics, or the video window can be maximized to cover the entire screen. Thus the SVGA output to the flat-panel and external CRT displays can include both the DVD video and the computer-generated graphics. This composite image is sent to TV encoder 50 for conversion to NTSC/PAL format.

The DVD video overlaying the computer-generated graphics is thus also displayed on the TV monitor. Since the DVD-video window can be maximized to full-screen, the video can be displayed without computer graphics on the TV monitor. Such full-screen video is ideal for copyright pirates. Thus copyright protection is desirable for the graphics system.

Copy-protection is included on DVD disks by embedding code 46 on a DVD disk. Code 46 is read by DVD disk drive 48 and sent to DVD player 42, which is a software application that controls playing DVD videos by DVD disk drive 48 using standard operating-system functions and drivers (not shown). An encryption key from code 46 is passed up to DVD navigator 40, a higher-level application that controls playing of one or more DVD videos.

DVD navigator 40 does not communicate directly with TV encoder 50 since the hardware present varies from one PC to another. Instead, display driver 30 receives the encryption key from DVD navigator 40 and writes it to key register 52 in TV encoder 50. Display driver 30 knows the exact I/O address of key register 52, which can vary from PC to PC. Video BIOS 32 is used by display driver 30 to determine the I/O addresses of registers in TV encoder 50. During system initialization, video BIOS 32 reads I/O register 54 on TV encoder 50 to determine the range of I/O addresses assigned to registers in TV encoder 50. Different address ranges can be assigned to allow for a variety of hardware configurations of a PC.

Video BIOS 32 uses scratch register 33 to store information such as the I/O address and other information about TV encoder 50. When display driver 30 requests information about TV encoder 50, video BIOS 32 can simply read scratch register 33 rather than registers 54, 56 in TV encoder 50. The slower register 54, 56 then need only be read at system initialization, improving performance.

Video BIOS 32 also reads ID register 56 on TV encoder 50 at initialization. ID register 56 contains a manufacturer-specific code that identifies the manufacturer and model of TV encoder 50. This manufacturer-specific code can be decoded or looked up in a table of all possible codes to determine the capabilities of TV encoder 50. For example, early, simpler TV encoders can be assigned codes from zero to one million, while more advanced TV encoders that include advanced copy-protection capabilities can be assigned codes over one million.

In particular, advanced copy-protection capabilities that conform to the standards by MacroVision Corp. of Sunnyvale, Calif., can be identified or categorized by the exact capabilities, such as the ability to add low-level pulses. When TV encoder 50 has the capability of adding these low-level pulses to the TV-OUT, then it is safe to output the DVD video to the TV monitor. Any bootleg VCR recording is un-viewable because the low-level pulses are mistaken for attenuated sync pulses in the poorer-quality VCR recording. A 22-byte encryption key written to key register 52 enables TV encoder 50 to output the DVD video.

Older TV encoders may not have key register 52. These older TV encoders can peacefully co-exist in a system playing the DVD video when display driver 30 emulates copy protection by disabling TV encoder 50. An allow-TV flag, ALLOW_TV flag 44, is stored in Windows registry 34. Display driver 30 determines when TV encoder 50 is an older, non-MacroVision compliant TV encoder, and then disables TV encoder 50. Other applications are prevented from re-enabling TV encoder 50 by ALLOW_TV flag 44, which is set by display driver 30.

Multiple copies of DVD navigator 40 and DVD player 42 can exist in a PC system. each DVD navigator 40 is assigned an identifier or DVD_ID. The DVD_ID of each running DVD navigator 40 is stored by display driver 30 in DVD_ID register 36. The DVD_ID of the DVD navigator to most-recently enable or disable TV encoder 50 is also stored by display driver 30 in LAST_DVD register 38. These are software "registers" or variables stored in main memory that is accessed by display driver 30.

DVD Request to Display Driver—FIG. 4

FIG. 4 shows the format of a request byte sent from the DVD navigator to the display driver. Each running instance of DVD navigator 40 of FIG. 3 is assigned an identifier by the display driver, DVD_ID. Request byte 60 includes DVD_ID field 62 that contains this 5-bit identifier.

The operation requested, MV_OP_TYPE, is contained in operation field 64 of request byte 60. Operation field 64 is a 2-bit field. A 00 operation is a request for the TV encoder to disable MacroVision encoding and turn off the TV encoder so that the DVD video cannot be displayed on the TV monitor or taped by a VCR attached to TV-OUT. The other three encodings of operation field 64 are requests to enable MacroVision encoding and output the DVD video to the TV monitor.

DVD Status From Display Driver—FIG. 5

FIG. 5 shows the format of a status byte sent in reply back to the DVD navigator from the display driver. The operation requested by the DVD navigator in the request byte is performed by the display driver, which enables, disables, or changes the encoding type or mode of the TV encoder. The result of the requested operation is returned to the DVD navigator in status byte 70. In addition to four reserved bits (not shown), status byte 70 contains a 4-bit status or return code that indicates if the requested operation was successfully performed. Each DVD navigator should use a unique identifier, DVD_ID, which is sent in the request byte. If the DVD navigator sends all zeros as it's identifier, or if it uses an identifier already assigned to another navigator, then an error is signaled by setting invalid DVD_ID bit 72. When a correct DVD_ID is received, then invalid DVD ID bit 72 is cleared.

The display driver determines the capabilities of the TV encoder by querying the video BIOS, which reads the capabilities stored in its scratch register. When the TV encoder is an advanced encoder able to perform MacroVision encoding for copy-protection, then MacroVision-compliant bit 74 is set. MacroVision-compliant bit 74 is cleared for older TV encoders that cannot add copy-protection encodings to the TV-OUT. MacroVision-compliant bit 74 allows the DVD navigator to decide whether or not to play copy-protected DVD titles.

The configuration state of the display system is indicated by TV on bit 76. When the TV encoder is disabled and thus no image can be seen on a TV monitor, TV on bit 76 is cleared. The DVD navigator can read this TV on bit and decide to play copyrighted DVD titles since there is no TV output to be copied; the DVD video is only visible on the SVGA displays.

The display driver may or may not be able to complete the operation requested by the DVD navigator. For example, another DVD navigator may have disabled MacroVision encodings, preventing any other DVD navigators from enabling the TV output. The TV encoder cannot be enabled or reconfigured since it would possibly allow copying of another DVD title in progress. When the TV encoder is not MacroVision-compliant, then the TV encoder cannot be enabled, disabled, or re-configured for MacroVision encodings since this capability is not present in the hardware. Also, when an invalid DVD_ID is sent, the operation is cancelled. In all these cases, the requested operation was not performed by the display driver, and operation status bit 78 is cleared to indicate failure. When the operation successfully enabled, disabled, or re-configured the MacroVision features in the TV encoder, then operation status bit 78 is set to indicate success.

Return Codes in Status Bytes—FIG. 6

FIG. 6 highlights the meaning of return codes from the display driver to the DVD navigator. The return code is composed of the four bits 72, 74, 76, 78 shown in FIG. 5. The four bits are: invalid DVD_ID bit 72, MacroVision-compliant bit 74, TV on bit 76, and operation status bit 78.

Code 1000 has invalid DVD_ID bit 72 set and operation status bit 78 cleared, indicating an unsuccessful operation because an invalid DVD identifier was sent. When the PC does not have a MacroVision-compliant TV encoder, then MacroVision-compliant bit 74 is cleared. Operation status bit 78 is cleared because no MacroVision can be performed. One of two possible codes is returned: 0010 when the TV encoder is on and the TV output is active, and 0000 when the TV encoder is disabled and the TV output is inactive. DVD videos can still be played, but only if the TV output is disabled.

When a MacroVision-compliant TV encoder is detected, and a correct DVD_ID is used, several return codes can occur. When the TV encoder is off, return code 0101 is generated after the TV encoder is re-configured. When the request is to turn off the TV encoder, return code 0110, an unsuccessful operation, is returned when another DVD navigator is playing preventing the TV encoder from being turned off. When the MacroVision encoding in the TV encoder can be turned off, code 0111 is returned, a successful operation. The TV encoder itself is still on even though the MacroVision features are disabled.

Turning on the MacroVision features when the TV encoder is also on results in the successful return code 01111. Other DVD navigators can also be playing, using the MacroVision features; it is only requests to turn off Macro-Vision features that are unsuccessful when other DVD players are active.

Figure 7:
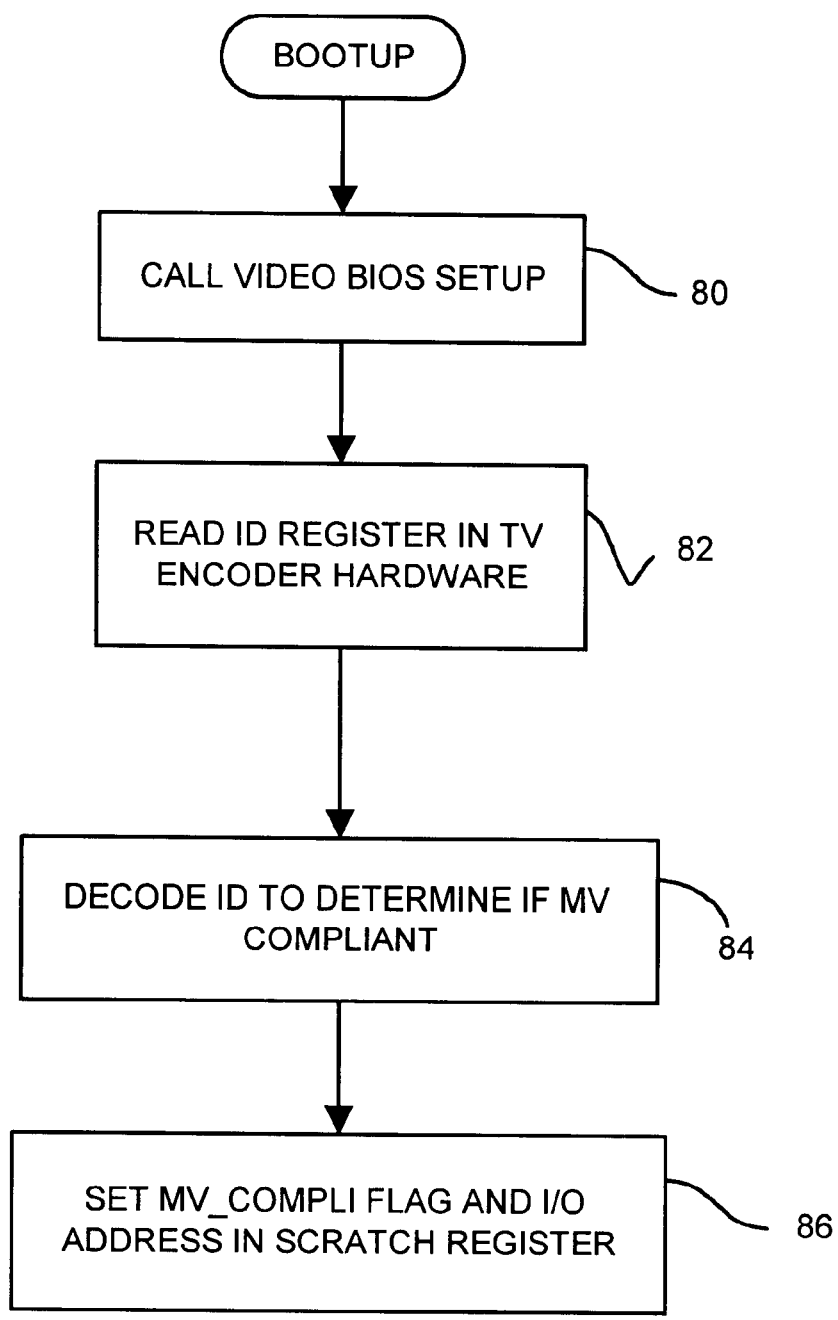
FIG. 7 is a flowchart of the video BIOS being initialized for copy-protection features.

Video BIOS Reads TV Encoder Capabilities at Initialization—FIG. 7

FIG. 7 is a flowchart of the video BIOS being initialized for copy-protection features. At bootup or system initialization, the video BIOS is called and executed, step 80. The video BIOS calls the display driver to initialize them and configures the graphics controller and the graphics sub-system. To setup the TV encoder, the video BIOS reads the I/O register on the TV encoder for the address range of the registers on the TV encoder. The ID register 56 of FIG. 3 is also read, step 82. The manufacturer-specific code from the ID register decoded to determine if the TV encoder is capable of advanced MacroVision encoding, step 84. Then in step 86 the video BIOS writes its scratch register with the I/O starting address and sets a MacroVision-compliant flag, MV_COMPLI, when the TV encoder is MacroVision-compliant.

The video BIOS thus reads the ID register in the TV encoder and sets or clears a flag in its scratch register to remember whether the TV encoder is MacroVision-compliant or not.

Figure 8A:
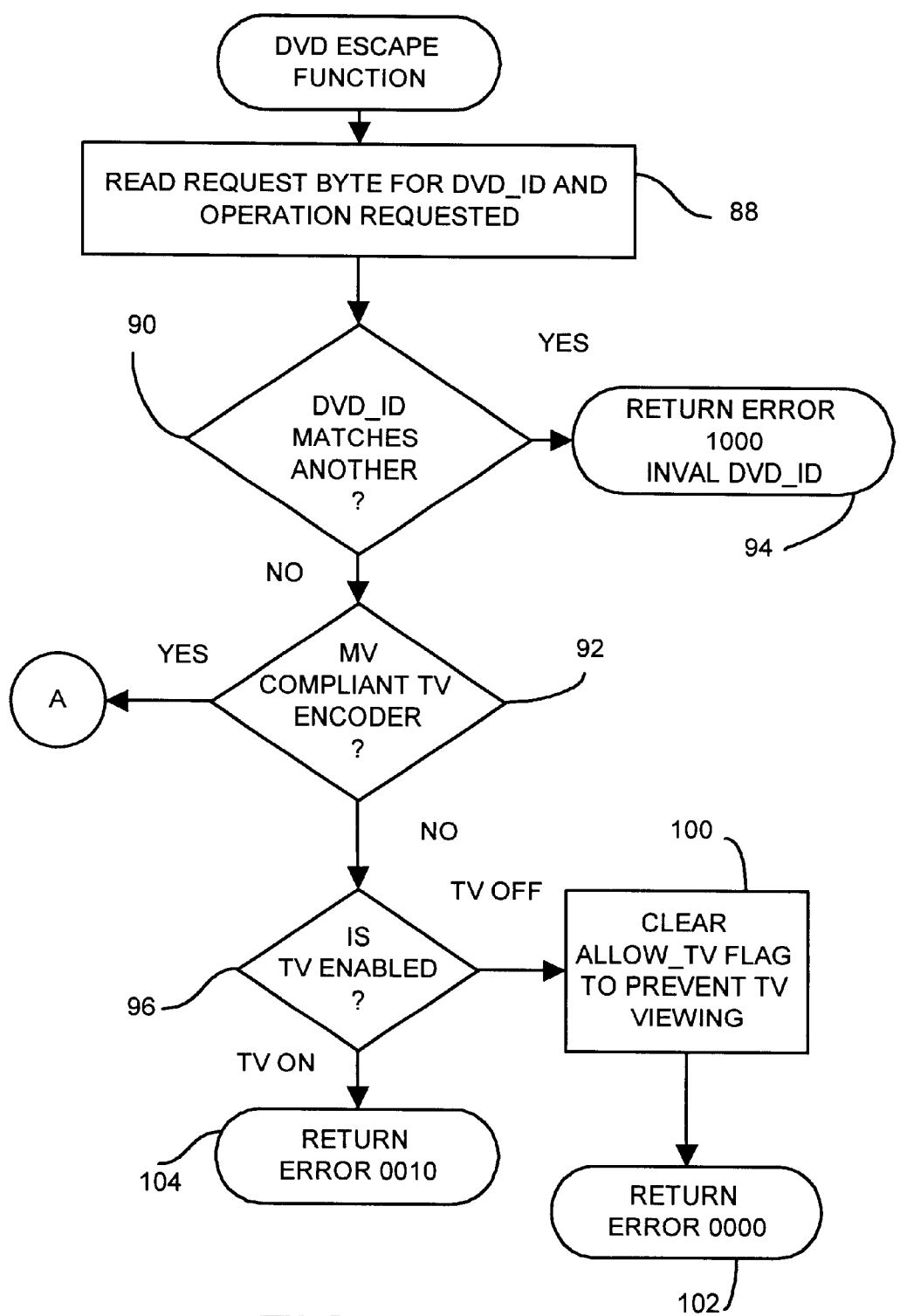
FIGS. 8A, 8B show a flowchart of a DVD function of the display driver that configures the TV encoder for MacroVision encodings or emulates copy protection for older, non-compliant TV encoders.
Figure 8B:
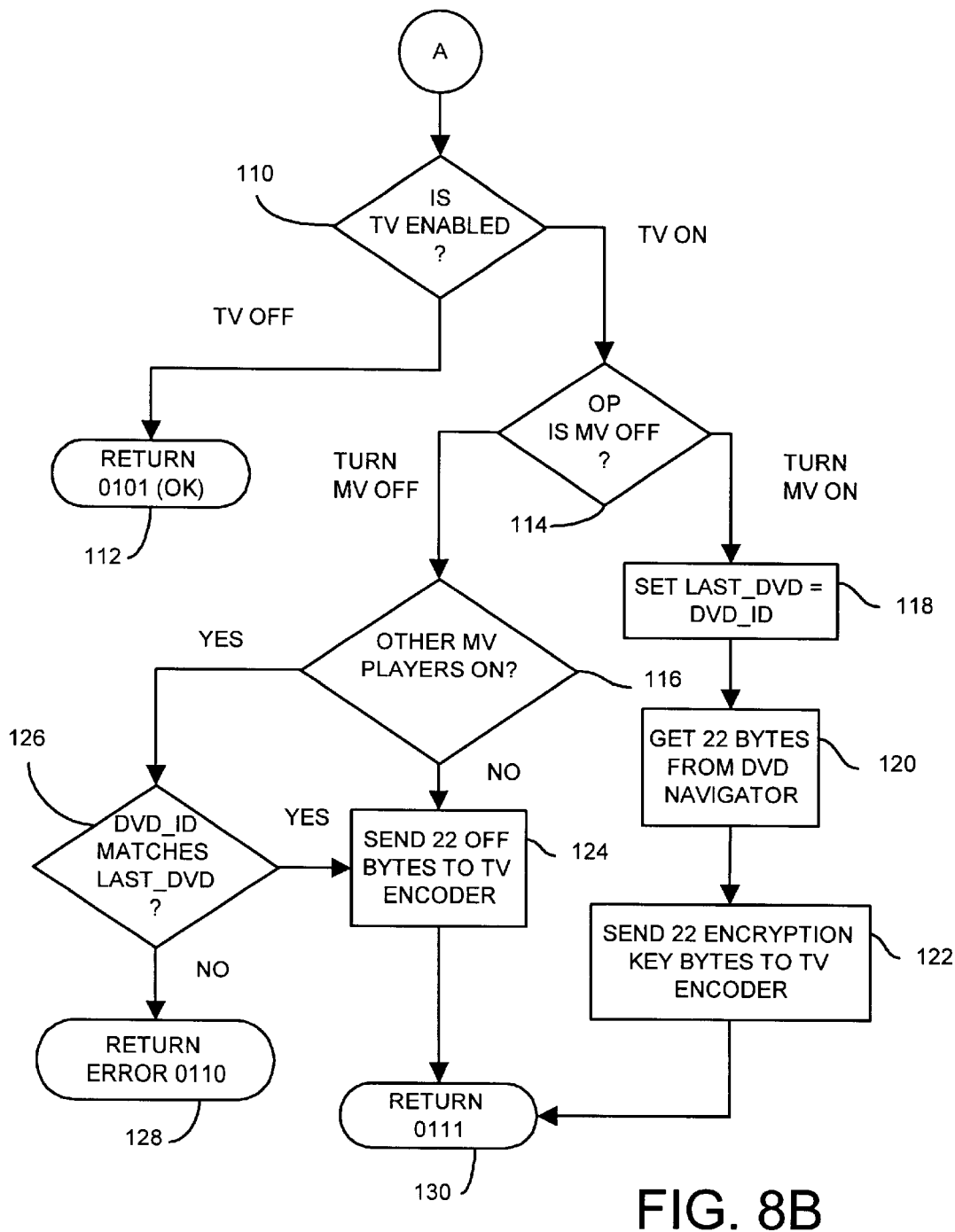

Display Driver DVD Function—FIGS. 8A, 8B

FIGS. 8A, 8B show a flowchart of a DVD function of the display driver that configures the TV encoder for MacroVision encodings or emulates copy protection for older, non-compliant TV encoders. This function is known as an escape function and is called by DVD navigator 40 (of FIG. 3) by sending the request byte (FIG. 4) to display driver 30 (FIG. 3). The display driver executes the escape function of FIGS. 8A, 8B, enabling, disabling, or re-configuring MacroVision features in the TV encoder, or turning the TV encoder on or off to emulate copy-protection. One of the return codes of FIG. 6 is sent back to the DVD navigator by the display driver once the escape function is completed.

In FIG. 8A, the request byte from the DVD navigator is read and the DVD_ID for the navigator and the operation requested are extracted, step 88. The DVD_ID is compared in step 90 to DVD_IDs for other DVD navigators that are stored in DVD_ID register 36 (FIG. 3). If a match is found, or if the DVD_ID is zero, the DVD ID is not valid. The return code 1000 indicating an invalid DVD_ID and an unsuccessful operation is returned to the calling DVD navigator, step 94.

For valid DVD_IDs, the display driver queries the video BIOS, which reads its scratch register. Step 92 uses the video BIOS query to determine when the TV encoder is MacroVision-compliant and can thus accept the requested operation from the DVD navigator. For older TV encoders, MacroVision encoding is not supported. Step 96 determines if the TV encoder is on by making a BIOS call or by reading a scratch register in the display driver that indicates the currently configures displays (flat-panel LCD, CRT, TV). When the TV encoder is active, but it is not MacroVision-compliant, error code 0010 is returned, step 104, an unsuccessful operation. A message box is displayed to the user saying:

"The system does not have a TV encoder that is Macro-Vision compliant. TV is ON. Must stop playing DVD."

When the TV is on, illegal taping of the DVD title could occur since the TV output cannot be MacroVision encoded for copy-protection. Thus the user must first reconfigure the displays to turn off the TV monitor before the DVD navigator plays the copy-protected DVD title. The user can re-configure the displays using the Windows dialog boxes or by using a hotkey combination such as FN-F8.

When the TV is already off, no taping can occur, so the DVD title can be played for viewing on the LCD or CRT screens. In step 100, the ALLOW_TV flag in the display mode key in the Windows registry is cleared to prevent the TV from being enabled. The ALLOW-TV flag blocks the hotkey combination or dialog boxes from re-enabling the monitor. The return code 0000 is generated, step 102, indicating that the requested operation was unsuccessful, but that the TV is off. The DVD navigator can continue playing the DVD title since the TV encoder and TV output are disabled. A message box is displayed to the user saying:

"The system does not have a TV encoder that is Macro-Vision compliant. TV is off, so it is OK to play DVD."

In FIG. 8B, the flowchart continues for MacroVision-compliant TV encoders. When step 110 determines that the TV encoder is disabled, then copy protection is not necessary. Return code 0101 is sent back to the DVD navigator, step 112, which then safely plays the DVD title for display in SVGA format on the flat-panel or CRT screens. A message box is displayed to the user saying:

"Successfully Turned MacroVision on or off. It doesn't matter since TV is off."

When step 110 determines that the TV encoder is enabled, the requested operation from the request byte is examined, step 114. When the request is to disable MacroVision encoding, then it must be determined if other DVD navigators are playing DVD titles, step 116. Blindly disabling MacroVision encoding could allow for an illegal copy of these other DVD titles.

When no other DVD titles are playing, DVD_ID register 36 (FIG. 3) in the display driver is empty except for the requesting DVD navigator. In step 124 a 22-byte encryption key that turns off MacroVision encoding is sent from the DVD navigator and written to key register 52 in the TV encoder. A successful return code of 0111 is sent, step 130.

The 22-byte encryption key in key register 52 unlocks the MacroVision feature. An encrypted key is used for turning off MacroVision features so that only valid applications can disable MacroVision encoding.

When one or more other DVD navigators are playing titles, the last DVD navigator to turn on MacroVision encoding is the only one that can turn it off. LAST_DVD register 38 in the display driver is read for the identifier for the last DVD navigator to enable MacroVision encoding. This last identifier is compared to the current DVD_ID, step 126, and a match causes the 22-byte encryption key to be sent from the DVD navigator to the key register in the TV encoder, step 124. This turns off the MacroVision encoding feature but leaves the TV output enabled.

Otherwise, the MacroVision encoding cannot be turned off by the current DVD navigator since it was not the last to enable MacroVision encoding. Error code 0110, an unsuccessful operation with TV on for a MacroVision-compliant TV encoder, is returned, step 128. A message box is displayed to the user saying:

"Cannot Turn Off MacroVision. Already in Use By Another DVD Player"

When step 114 determines that the requested operation is to turn on MacroVision encoding, the operation is always successful regardless of whether other DVD titles have already enabled MacroVision encoding. LAST_DVD register 38 is a stack written with the DVD identifier of the current DVD navigator, DVD_ID, step 118. The 22-byte encryption key is read from the current DVD navigator, step 120. Then in step 122, the 22-byte encryption key from the DVD navigator is written to key register 52 in the TV encoder. The 22-byte encryption key in key register 52 enables MacroVision encoding of the DVD pixel stream, allowing the DVD title to be safely played by fitting with a playing key in the DVD pixel stream.

A successful operation is indicated by returning code 0111, step 130. A message box is displayed to the user saying:

"Successfully Turned On or Off MacroVision."

These message boxes are useful for development but can be disabled for the end user.

Advantages of the Invention

A copyright-protection scheme using the modified display driver is ideal for portable PCs. The software display drivers for the graphics subsystem operate with newer MacroVision-compliant TV encoders, and older scan-line converters that are not MacroVision-compliant. The display driver blocks viewing of formats that can be copied by a VCR but allows viewing in computer-monitor formats that are not easily taped.

The display driver is implemented in software or firmware and can easily be modified or upgraded as new capabilities are added. Flash memory can be used to store the video BIOS and the display driver can reside on the hard disk or also in the flash memory. Program updates of the display driver can easily be written to the flash memory or the hard disk.

The invention does not rely on any one type of copy-protection scheme. The invention describes operation with MacroVision copy-protection since it is the current standard for DVD titles, but as future copy-protection schemes emerge or current schemes are enhanced, the display driver can be adapted to operate with them.

Alternate Embodiments

Several other embodiments are contemplated by the inventor. Other copy-protection schemes can be substituted for MacroVision. The invention can also be applied to desktop PCs, although the portability of laptop PCs makes them more important for copy protection. The detailed description has repeatedly referred to SVGA resolution for convenience. Other resolutions such as VGA, XGA, and future standards can be substituted. The pixel stream from the graphics controller can be converted to different computer-graphics formats, such as an analog format for a CRT and a digital or grayscale format for a flat-panel display. Request and status bytes have been referred to, but other data widths can be substituted. Reserved bits may also be included for later feature enhancements.

Message boxes showing the status and return codes are useful for debugging but their display can be disabled. The DVD navigator can generate its own messages, perhaps only for errors or to suggest that the user disable the TV monitor to play the copy-protected DVD title on legacy equipment.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

APPENDIX

```
Below is pseudo-code of the driver that handles escape calls from DVD
navigator:
Switch(Operation)
          case MCV_NAVI_SET
              get IpszInData.Mode
              dispatch data
                      => MacroVision request
                      => DVD Navigator ID
              if( incorrect DVD Navigator ID)
              {
                  return binary 1 0 0 0
              }
              if Macrovision TV encoder
              {
                  if TV is ON
                  {
                      if MacroVision request to turn OFF
                      {
                          if no application requests ON
                              send 22 bytes represent OFF to
TV encoder
                              return binary 1 1 1
                      else if DVD Navigator ID match the previous one which turned it on
                              send 22 bytes represent OFF to
TV encoder
                          return binary 1 1 1
                              else
                                  return binary 1 1 0 // can't turn
off
                      }
```

APPENDIX
-continued

```
                      else MacroVison to turn ON or change type
                      {
                          set DVD Navigator ID to turn on
                          get the 22 bytes for each type
                          Send 22 bytes encyprtion to TV
encoder
                          return binary 1 1 1
                      }
                  }
                  else TV is OFF
                  {
                      return binary 1 0 1
                  }
              }
              else not MacroVision encoder
              {
                  if TV is on
                      If first time this state
                          return binary 0 1 0
                      else
                          Turn off TV
                          Set flag to disable TV call from
other
                          application or hotkey.
                          return binary 0 0 0
                      else if TV is OFF
                          Set flag to disable TV call from other
application or hotkey.
                          return binary 0 0 0
              }
```

I claim:

1. A method for emulating copy-protection on a personal computer (PC) with a computer display for displaying in a computer-generated format that cannot be copied by a VCR recorder, the method comprising the steps of:

(a) sending a copy-protection request from a video player application to a display driver;

(b) determining when the PC contains a TV encoder that has advanced copy-protection features that prevent illegal copying;

when the PC contains a TV encoder that does not have advanced copy-protection features:

(c) determining when the TV encoder is active for converting computer-generated graphics for display on the computer display to TV-encoded graphics viewable on a TV monitor;

(d) when the TV encoder is active, displaying a message on the computer display to a user of the PC, the message requesting that the TV encoder be disabled before the video player application resumes play of a copy-protected video;

(e) when the TV encoder is not active, sending a status word to the video player application indicating that the TV encoder is off and the copy-protected video can be safely played to the computer display;

when the PC contains a TV encoder with advanced copy-protection features:

(f) determining when the TV encoder is not active for converting computer-generated graphics to TV-encoded graphics viewable on a TV monitor and signaling the video player application to continue playing the copy-protected video to the computer display;

(g) when the TV encoder is active and the copy-protection request is a request to enable the advanced copy-protection features of the TV encoder, sending an encryption key from the video player application to the TV encoder to enable the advanced copy-protection features; and (h) when the TV encoder is active and the copy-protection request is a request to disable the advanced copy-protection features of the TV encoder, sending an encryption key from the video player application to the TV encoder to disable the advanced copy-protection features, whereby the display driver emulates copy protection for the TV encoder without advanced copy-protection features by disabling the TV encoder when a copy-protected video is played, but the display driver sends the encryption key to the TV encoder with advanced copy-protection features.

2. The method of claim 1 wherein the copy-protection request includes a requested operation and a player-app identifier, the player-app identifier uniquely identifying the video player application when a plurality of video player applications request copy protection;

wherein the method further comprises:

comparing the player-app identifier from the copy-protection request to a list in the display driver of player-app identifiers for the plurality of video player applications; and generating an error when the player-app identifier matches one of the player-app identifiers in the list, whereby the display driver provides copy protection for multiple video player applications.

3. The method of claim 2 further comprising for step (g) when the TV encoder is active and the copy-protection request is a request to enable the advanced copy-protection features of the TV encoder, writing the player-app identifier to a last identifier register in the display driver.

4. The method of claim 3 further comprising for step (h) when the TV encoder is active and the copy-protection request is a request to disable the advanced copy-protection features of the TV encoder, comparing the last identifier register to the player-app identifier to determine a match when the video player application was a last application to enabled the advanced copy-protection features of the TV encoder; only sending the encryption key from the video player application to the TV encoder to disable the advanced copy-protection features when a match is detected; and returning an error code to the video player application when a match is not detected, whereby only a last video player application to enable the advanced copy-protection features may disabled the advanced copy-protection features.

5. The method of claim 4 further comprising for step (e) when the TV encoder is not active, and the TV encoder does not have advanced copy-protection features: preventing enablement of the TV encoder by a hotkey by writing a block-TV flag in a system registry for the PC, whereby the TV encoder is prevented from being re-enabled by the hotkey when the copy-protected video is played.

6. The method of claim 5 wherein the video player application is a DVD navigator application for playing digital-versatile disk (DVD) titles.

7. The method of claim 2 wherein the advanced copy-protection features include MacroVision-compliant encoding.

8. The method of claim 2 wherein for step (b), a video BIOS for the PC determines when the PC contains the TV encoder with advanced copy-protection features that prevent illegal copying by reading feature registers on the TV encoder during system initialization, the video BIOS storing a compliant flag in a scratch register indicating when the TV encoder has the advanced copy-protection features, wherein the display driver queries the video BIOS to read the compliant flag in the scratch register to determine determines when the PC contains the TV encoder with advanced copy-protection features; whereby the feature registers on the TV encoder are read during system initialization.

9. A laptop personal computer (PC) for preventing illegal copying of videos played on the laptop PC, the laptop PC comprising:

a graphics controller for generating a pixel stream in a computer-graphics format, the pixel stream for display by a flat-panel display on the laptop PC;

an optical-disk player for playing copyrighted optical disks, the optical-disk player outputting copy-protected videos to the graphics controller for display;

a TV encoder, coupled to receive the pixel stream from the graphics controller, for converting the computer-graphics format to a TV format;

a video BIOS for controlling the graphics controller, the video BIOS having a scratch register for storing a flag indicating when the TV encoder is compliant with advanced copy-protection standards;

a display driver, coupled to the video BIOS, for further controller the graphics controller, the display driver also for controlling the TV encoder;

a player application for controlling the optical-disk player, the player application including means for generating a request for copy protection to the display driver;

a copy-protection function in the display driver for receiving the request from the player application, the copy-protection function including means for reading the scratch register in the video BIOS to determine when the TV encoder can accept advanced copy-protection commands from the player application;

transmitting means, in the display driver, for transmitting a encryption key from the player application to the TV encoder when TV encoder can accept advanced copy-protection commands from the player application; and emulation means, in the display driver, for disabling the TV encoder when the request from the player application is a request to enable copy-protection in the TV encoder and the flag in the video BIOS indicates that the TV encoder is not compliant with advanced copy-protection standards, whereby copy-protection is emulated by the display driver for non-compliant TV encoders by disabling output from the TV encoder in the TV format.

10. The laptop PC of claim 9 further comprising:

a plurality of player applications for playing a plurality of copy-protected videos, each player application having a player identifier;

a last-identifier register, readable by the display driver, for storing the player identifier for a last player application to enable copy protection;

compare means, in the display driver, for comparing the last-identifier register to the player identifier for a player application requesting copy protection;

error means, in the display driver, for generating an error code and not disabling copy-protection by the TV encoder when the compare means does not signal a match, whereby only a last player application to enable copy protection can disable copy protection.

11. The laptop PC of claim 10 further comprising:
an identifier list, readable by the display driver, for storing player identifiers for all player applications requesting copy protection; and
second compare means, for comparing the player identifier to the identifier list and generating an error code when a match is found,
whereby only player applications with unique player identifiers can re-configure copy protection.

12. The laptop PC of claim 9 further comprising:
a system registry for storing system parameters;
a TV flag in the system registry for indicating when the TV encoder is disabled, the TV flag preventing other applications from re-enabling the TV encoder when disabled by the display driver.

13. The laptop PC of claim 9 wherein the computer-graphics format is non compatible with the TV format, wherein a tape recorder attached to the pixel stream is unable to record a tape for viewing on a standard TV monitor.

14. The laptop PC of claim 9 wherein the TV format is NTSC or PAL.

15. The laptop PC of claim 9 wherein the pixel stream is also for display on an external cathode-ray tube (CRT) monitor attached to the laptop PC.

16. The laptop PC of claim 9 further comprising: a status code returned to the player application from the display driver, the status code including:
a successful operation flag to indicate when the request for copy protection was successfully completed;
a TV-on flag for indicating when the TV encoder is enabled and converting the computer-graphics format to the TV format;
a compliant flag for flag indicating when the TV encoder is compliant with advanced copy-protection standards.

17. A computer-program product comprising:
a computer-usable medium having computer-readable program code means embodied therein for establishing copy-protection on a personal computer (PC), the computer-readable program code means in the computer-program product comprising:
means for sending a copy-protection request from a video player application to a display driver;
compliant means for determining when the PC contains a TV encoder that has advanced copy-protection features that prevent illegal copying;
TV on means for determining when the TV encoder is active for converting computer-generated graphics for display on a computer display to TV-encoded graphics viewable on a TV monitor;
first legacy means, activated when the PC contains a TV encoder that does not have advanced copy-protection features, for displaying a message on the computer display to a user of the PC, the message requesting that the TV encoder be disabled before the video player application resumes play of a copy-protected video when the TV encoder is active;
second legacy means, activated when the PC contains a TV encoder that does not have advanced copy-protection features, for sending a status word to the video player application indicating that the TV encoder is off and the copy-protected video can be safely played to the computer display, when the TV encoder is not active;
advanced copy-protection means, activated when the PC contains a TV encoder with advanced copy-protection features, including:
advanced TV off means, activated when the TV encoder is not active, for converting computer-generated graphics to TV-encoded graphics viewable on a TV monitor and signaling the video player application to continue playing the copy-protected video to the computer display;
key enable means, activated when the TV encoder is active and the copy-protection request is a request to enable the advanced copy-protection features of the TV encoder, for sending an encryption key from the video player application to the TV encoder to enable the advanced copy-protection features; and
key disable means, activated when the TV encoder is active and the copy-protection request is a request to disable the advanced copy-protection features of the TV encoder, for sending an encryption key from the video player application to the TV encoder to disable the advanced copy-protection features,
whereby the display driver emulates copy protection for the TV encoder without advanced copy-protection features by disabling the TV encoder when a copy-protected video is played, but the display driver sends the encryption key to the TV encoder with advanced copy-protection features.

18. The computer-program product of claim 17 wherein the copy-protection request includes a requested operation and a player-app identifier, the player-app identifier uniquely identifying the video player application when a plurality of video player applications request copy protection;
wherein readable program code means further comprises:
compare means for comparing the player-app identifier from the copy-protection request to a list in the display driver of player-app identifiers for the plurality of video player applications; and
error means for generating an error when the player-app identifier matches one of the player-app identifiers in the list,
whereby the display driver provides copy protection for multiple video player applications.

19. The computer-program product of claim 18 further comprising:
a last identifier register in the display driver;
last writing means, activated when the TV encoder is active and the copy-protection request is a request to enable the advanced copy-protection features of the TV encoder, for writing the player-app identifier to a last identifier register in the display driver.

20. The computer-program product of claim 19 further comprising:
last compare means, activated when the TV encoder is active and the copy-protection request is a request to disable the advanced copy-protection features of the TV encoder, for comparing the last identifier register to the player-app identifier to determine a match when the video player application was a last application to enabled the advanced copy-protection features of the TV encoder;
wherein the encryption key is sent from the video player application to the TV encoder to disable the advanced copy-protection features only when a match is detected; and
return means for returning an error code to the video player application when a match is not detected,
whereby only a last video player application to enable the advanced copy-protection features may disabled the advanced copy-protection features.

* * * * *